United States Patent
Bellaouar et al.

(10) Patent No.: US 7,509,101 B2
(45) Date of Patent: Mar. 24, 2009

(54) METHOD AND APPARATUS FOR REDUCING LEAKAGE IN A DIRECT CONVERSION TRANSMITTER

(75) Inventors: Abdellatif Bellaouar, Richardson, TX (US); Alan R. Holden, McKinney, TX (US); Sher J. Fang, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 389 days.

(21) Appl. No.: 10/833,908

(22) Filed: Apr. 28, 2004

(65) Prior Publication Data
US 2005/0070238 A1 Mar. 31, 2005

Related U.S. Application Data

(60) Provisional application No. 60/505,924, filed on Sep. 25, 2003.

(51) Int. Cl.
*H04B 1/28* (2006.01)
*H04B 1/04* (2006.01)
(52) U.S. Cl. .......... 455/127.1; 455/91; 455/114.2; 455/333
(58) Field of Classification Search .......... 455/333, 455/91, 114.1, 114.2, 115.1, 127.1, 323, 455/313, 298, 296
See application file for complete search history.

(56) References Cited

U.S. PATENT DOCUMENTS

| | | | | |
|---|---|---|---|---|
| 3,866,155 | A * | 2/1975 | Kobayashi et la. | 333/191 |
| 5,444,737 | A * | 8/1995 | Cripps et al. | 375/219 |
| 6,211,745 | B1* | 4/2001 | Mucke et al. | 331/117 R |
| 6,567,649 | B2* | 5/2003 | Souissi | 455/83 |
| 6,803,655 | B2* | 10/2004 | Fujio et al. | 257/724 |
| 6,998,709 | B2* | 2/2006 | Khorram | 257/728 |
| 6,999,744 | B2* | 2/2006 | Kim | 455/310 |
| 7,132,900 | B2* | 11/2006 | Yahagi et al. | 331/108 C |
| 7,206,557 | B2* | 4/2007 | Aytur et al. | 455/118 |
| 2002/0060609 | A1* | 5/2002 | Huang et al. | 331/2 |
| 2002/0127972 | A1* | 9/2002 | Marshall et al. | 455/78 |
| 2004/0132424 | A1* | 7/2004 | Aytur et al. | 455/335 |
| 2005/0136860 | A1* | 6/2005 | Subasic et al. | 455/115.1 |
| 2006/0135071 | A1* | 6/2006 | Kim | 455/63.1 |
| 2008/0032641 | A1* | 2/2008 | Ahn | 455/114.2 |

* cited by examiner

*Primary Examiner*—Sonny Trinh
(74) *Attorney, Agent, or Firm*—Ronald O. Neerings; Wade James Brady, III; Frederick J. Telecky, Jr.

(57) ABSTRACT

Methods and apparatus for reducing the amount of leakage in a transmitter are disclosed. In one embodiment, a wireless transmitter is comprises: a divider providing a local oscillation (LO) signal, a plurality of mixers that receive the LO signal and receive a signal to be modulated, a summer coupled to the plurality of mixers, and a plurality of amplifiers serially coupled to the summer. The divider couples to a capacitor, a resistor, and a power supply and the resistor and the capacitor form a pole that attenuates the LO signal present on the power supply.

26 Claims, 1 Drawing Sheet

METHOD AND APPARATUS FOR REDUCING LEAKAGE IN A DIRECT CONVERSION TRANSMITTER

CROSS-REFERENCE TO RELATED APPLICATIONS

This application claims priority to Provisional U.S. Patent Application Ser. No. 60/505,924, filed on Sep. 25, 2003, entitled "A LOW CARRIER LEAKAGE DIRECT CONVERSION TRANSMITTER," incorporated herein by reference.

BACKGROUND

The present subject matter relates generally to radio transmission techniques and more particularly to reducing leakage in direct conversion radio transmitters.

Wireless communication devices have become ubiquitous in today's society. The heart of every wireless communication device consists of a transmitter and a receiver to transmit and receive radio signals. A radio frequency (RF) transmitter converts low frequency signals (e.g., in the 100 kHz-4 MHz range), to a desired RF frequency band (e.g., in the 1.9-2.0 GHz range) that may then be transmitted through various communication channels. The process of transforming the low frequency signals to an RF signal is referred to as mixing or "upconversion." This mixing is often performed by providing the frequencies to be mixed to a non-linear mixing device (e.g., a diode), where the sums and differences of these frequencies are generated.

Conventionally, the low frequency signals are upconverted to an intermediate frequency (IF) then upconverted again to an RF band using heterodyne techniques. More recently however, direct conversion transmitters directly convert the low frequency signals to higher frequency RF band signals without first converting to an IF. In this architecture, the low frequency signal is mixed with a frequency from a local oscillator (LO) that has a substantially higher frequency. Direct conversion architectures are advantageous in that fewer components are needed, thereby reducing overall system cost. However, although the direct conversion transmitter design allows a reduction in the number of components, imperfections in transmitter circuitry result in signals from the LO undesirably leaking into other portions of the transmitter circuitry. This leakage can be especially problematic at low output power.

Accordingly, methods and apparatuses for reducing the amount of leakage are desirable.

BRIEF SUMMARY

Methods and apparatuses for reducing the amount of leakage in a transmitter are disclosed. In one embodiment, a wireless transmitter comprises: a divider providing a local oscillation (LO) signal, a plurality of mixers that receive the LO signal and a signal to be modulated, a summer coupled to the plurality of mixers, and a plurality of amplifiers serially coupled to the summer. The divider couples to a capacitor, a resistor, and a power supply. The resistor and the capacitor form a pole that attenuates the LO signal present on the power supply.

Notation and Nomenclature

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein like components are indicated using like reference numbers.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be illustrative of that embodiment, and not intended to suggest that the scope of the disclosure, including the claims, is limited to that embodiment.

Figure 1A:
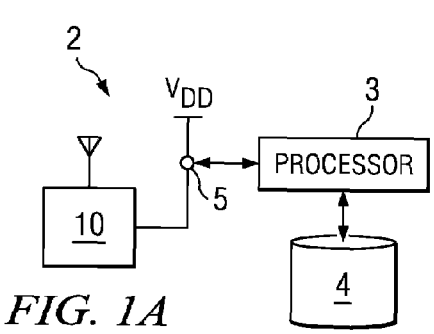
FIG. 1A illustrates a system used in determining leakage.
Figure 1C:
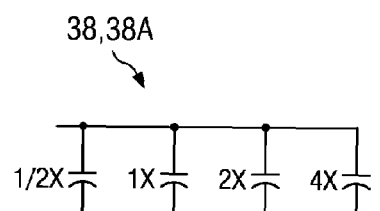
FIG. 1C depicts an adjustable capacitor.
Figure 1B:
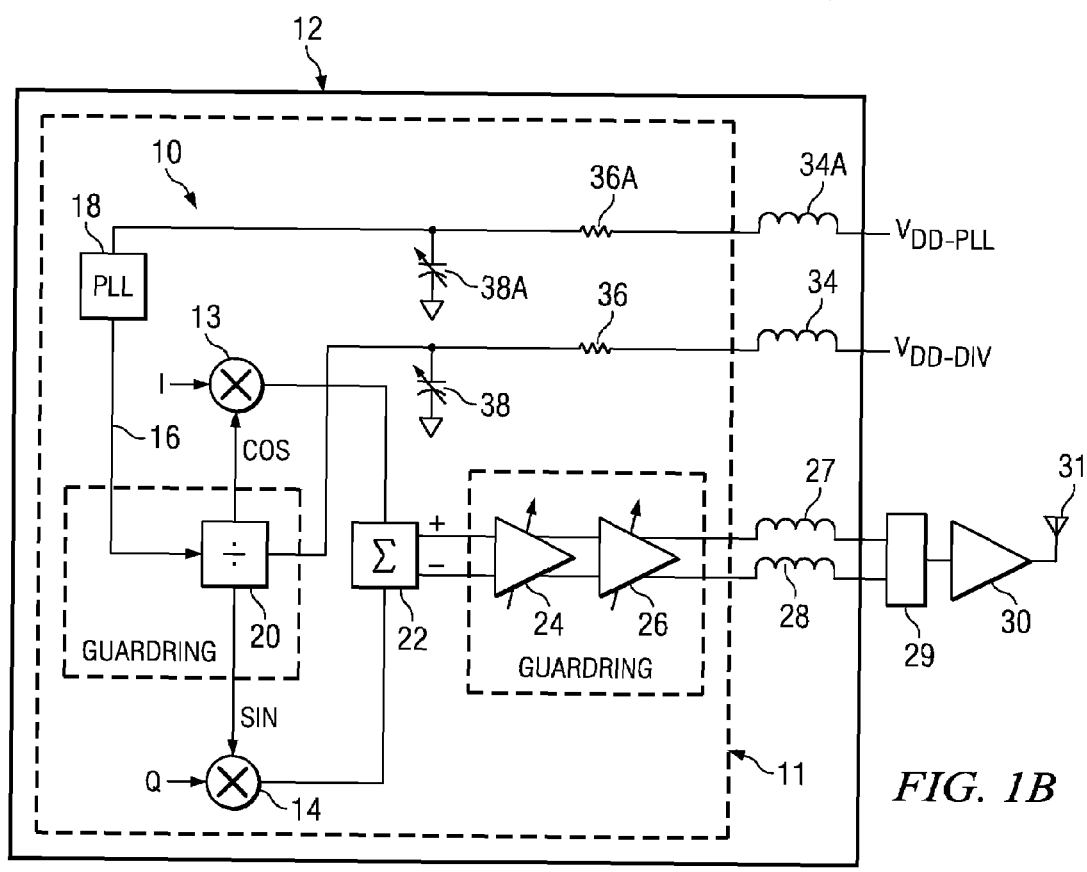
FIG. 1B depicts a system capable of reducing leakage.

FIG. 1A illustrates a system 2 used in determining leakage. System 2 comprises a processor 3 coupled to a wireless device 10. Device 10 may be implemented in integrated circuit form on a die 11 (depicted in FIG. 1B). Die 11 includes electrical circuitry such as transistors, inductors, resistors, and capacitors. Processor 3 is also coupled to a database 4. Database 4 may contain predetermined models and algorithms for use by processor 3. Device 10 is coupled to a power supply $V_{DD}$ through a current monitoring device 5. In some embodiments, current monitoring device 5 is an ammeter. Current monitoring device 5 provides measurements of current flowing from power supply $V_{DD}$ into device 10. Power supply $V_{DD}$ may be implemented as multiple power supplies (as illustrated in FIG. 1B). Processor 3 utilizes the current measurements from current monitoring device 5 to determine if current leakage from device 10 through the power supply $V_{DD}$ is occurring. Processor 3 may also indicate whether device 10 would benefit from leakage reduction techniques, FIG. 2 discusses this method in more detail below.

FIG. 1B depicts device 10 having reduced leakage. If device 10 is implemented in integrated circuit form, die 11 may be enclosed in a package 12. Package 12 includes bond-wires (described in detail below) that couple the package 12 to the die 11. A low frequency signal is provided to device 10 in two components: an "in-phase" component and an out-of-phase or "quadrature" component that is approximately 90° out of phase from the in-phase component. The quadrature component may represent the imaginary part of the low frequency signal whereas the real part of the low frequency signal is the in-phase component. The in-phase component is designated in FIG. 1B by the letter "I" whereas the quadrature component is designated using the letter "Q". The in-phase component is coupled to a mixer 13 and the quadrature component is coupled to a mixer 14. Mixers 13 and 14 are provided with carrier signals that are 90° out of phase, e.g., cos(ωt) and sin(ωt) respectively.

Timing signal 16 may be provided by a crystal-based oscillator or alternatively from a phase locked loop (PLL) 18. Timing signal 16 is coupled to a divider 20, which may be integrated into the PLL 18. Divider 20 may be adjusted to predetermined divide ratios and is capable of performing quadrature carrier generation. In this manner, divider 20 is capable of providing a local oscillation (LO) signal of frequency $\omega_{LO}$ to mixer 13 (e.g., $\cos(\omega_{LO}t)$) and is also capable of providing a quadrature version of the same LO signal of frequency $\omega_{LO}$ to mixer 14 (e.g., $\sin(\omega_{LO}t)$). As illustrated in FIG. 1B, divider 20 is coupled to a power supply $V_{DD\text{-}DIV}$ and PLL 18 is coupled to a power supply $V_{DD\text{-}PLL}$, the implications of these connection will be discussed in detail below.

Mixers 13 and 14 multiply the I and Q signals by the LO signal to upconvert the low frequency signal to the higher-frequency LO signal. The outputs of the mixers 13 and 14 are given by Equations (1) and (2) respectively.

$$I \cdot \cos(\omega_{LO} t) \quad (1)$$

$$Q \cdot \sin(\omega_{LO} t) \quad (2)$$

The outputs of mixers 13 and 14 are coupled to a summer 22, which has positive and negative differential outputs that couple to a differential amplifier 24. Summer 22 adds the results from mixers 13 and 14 (shown in Equations (1) and (2)), which yields the result shown in Equation (3) where the low I and Q signals have been upconverted to the frequency of the LO signal.

$$s(t) = I \cos(\omega_{LO} t) + Q \sin(\omega_{LO} t) \quad (3)$$

Summer 22 provides the result shown in Equation (3) in differential form. For example, the positive output may contain s(t) while the negative output may contain −s(t). Amplifier 24 processes the positive and negative outputs from summer 22 and provides differential signal outputs to differential amplifier 26. Differential amplifier 26 further processes the positive and negative signals and provides them from the die 11, through bondwires 27 and 28 (shown as inductors because of their inductive contribution), and outside the package 12 to a matching network 29. The matching network 29 generates a single-ended signal and couples the single-ended signal to a power amplifier (PA) 30. PA 30 further coupled the signal to an antenna 31 for transmission.

Amplifiers 24 and 26 are variable gain amplifiers (as indicated by the arrows through them) so that the amount of power provided to antenna 31 is varied based on different operating conditions. Power supplies $V_{DD\text{-}DIV}$ and $V_{DD\text{-}PLL}$ are coupled to die 11 through bondwires 34-34A. Inductor 34 further couples to the divider 20 through a resistor 36. A capacitor 38 is coupled to the resistor 36. Inductor 34A is similarly coupled to PLL 18 through a resistor 36A, and a capacitor 38A is coupled to resistor 36A.

Resistor 36 and capacitor 38 are implemented to filter any noise between divider 20 and the output signal of amplifier 26. For example, without resistor 36 and capacitor 38, offset voltages within divider 20 may generate noise in power supply $V_{DD\text{-}DIV}$, which subsequently leaks into the output of amplifier 26 via coupling between package inductances 27, 28, and 34. This type of noise generation is particularly prevalent at lower transmit power levels when the LO signal contribution is more pronounced with respect to the signal from amplifier 26. The pole generated by the combination of resistor 36 and capacitor 38 is adjusted to be lower than $\omega_{LO}$, as indicated in Equation (4) where $f_{LO}$ is the frequency of the LO signal in hertz, R is the resistance of resistor 36, and C is the capacitance of capacitor 38.

$$\omega_{LO} = 2 \cdot \Pi \cdot f_{LO} > 1/R \cdot C \quad (4)$$

Since resistor 36 is coupled to power supply $V_{DD\text{-}DIV}$ serially, the resistance is preferably small so that a maximum amount of voltage provided by power supply $V_{DD\text{-}DIV}$ is delivered to divider 20. For example, the resistance R of resistor 36 may be in the range of 50-100 Ω and may be implemented using any type of integrated circuit resistor, i.e., n-well resistors or poly resistors that may also include a salicide. Once the value for resistor 36 is chosen the capacitance of capacitor 38 (which may be variable as indicated by the arrow in FIG. 1B) may be selected based upon the frequency of the LO signal (which may be variable). In some embodiments, the capacitance of capacitor 38 is varied as a function of the frequency of the LO signal. For example, if divide quotient of divider 20 is adjustable the LO frequency provided to mixers 13 and 14 will vary with this divide quotient. As the LO frequency varies, capacitors 38 and 38A may be adjusted to track this change in LO frequency and suppress the LO frequency from coupling into the output signal. Further, capacitors 38 and 38A may be binary weighted capacitances as shown in FIG. 1C. As indicated in FIG. 1C, the binary weighted capacitance may be a combination of unit sized capacitors (size X) that are connected serially or in parallel to form the various binary values such as ½×, 1×, 2×, and 4×. The ½× value may be formed by connecting two 1× devices serially and the 2× value may be formed by connecting two 1× devices in parallel. Since each device in the binary weighted capacitance comprises combinations of unit sized devices, layout techniques may be implemented that improve the matching of the binary values and yield a relatively precise adjustment method.

Capacitor 38 may be implemented using various types of integrated circuit capacitors, i.e., metal-insulator-metal (MIM) capacitors or metal-oxide semiconductor field effect transistors (MOSFETs) configured to operate in accumulation mode to act as capacitors.

Other portions of device 10 that contain the LO signal may generate noise in the power supply $V_{DD\text{-}DIV}$. For example, the PLL 18 may contain a pre-scaler (not shown) that contains the LO signal and generates noise in the power supply $V_{DD\text{-}DIV}$, where this noise subsequently leaks into the output of amplifier 26. Thus, resistor 36A and capacitor 38A operate similarly for PLL 18.

Figure 2:
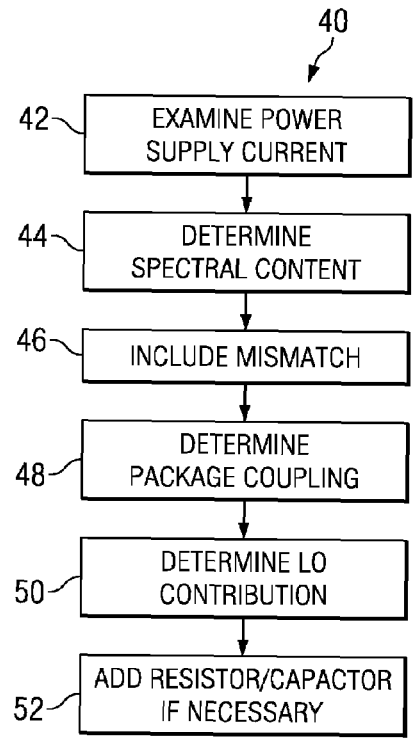
FIG. 2 illustrates a method to determine if a node will benefit from reduced leakage techniques.

FIG. 2 represents a method 40 used in determining whether a node will benefit from adding a resistor and capacitor combination. In block 42, the power supply current is monitored, using current monitoring device 5, as the portion in question operates. For example, the portion of die 11 in question may be device 10, which includes $V_{DD\text{-}PLL}$ and $V_{DD\text{-}DIV}$, and therefore the currents associated with power supplies $V_{DD\text{-}PLL}$ and $V_{DD\text{-}DIV}$ may be provided to processor 3 by current monitoring device 5. In block 44, the spectral content of the various power supply currents are determined by processor 3 performing a Fourier Transform on each current measurement.

As described above, summer 22 and amplifiers 24 and 26 are implemented in differential form, where positive and negative versions of the same signals are processed by these circuit blocks. Due to this differential nature, sources of mismatch in summer 22 and amplifiers 24 and 26 may be nullified before being measured by current monitoring device 5 and therefore may not be represented in the spectral content of block 44. For example, input transistors of amplifiers 24 and 26 (not specifically shown in the Figures) may not be precisely the same dimensions due to some kind of gradient across die 11 that occurred during the processing, and therefore a mismatch between the positive and negative signal paths may exist.

Accordingly, in block 46, predetermined mismatch models representing the amount of mismatch in device 10 are merged into the spectral content in block 46. The predetermined mismatch models may be based on test devices (akin to die 11), sometimes called "process characterization" devices, that were fabricated for the purpose of characterizing the manufacturing process. Information regarding mismatch gathered from these process characterization devices may be stored in database 4 for use by processor 3.

Bondwires 27, 28, 34, and 34A couple the package 12 to the die 11, and are separated from each other by a predetermined pitch or spacing. This pitch is largely dependant on the amount of circuitry contained on die 11. In any case, this pitch is often known before die 11 is fabricated. By using the pitch of bondwires in device 10, along with the amount of current flowing in the various bondwires, the pin-to-pin coupling effect of package 12 may be determined in block 48. For example, referring to FIG. 1B, the amount of coupling between the power supply $V_{DD\text{-}DIV}$ (i.e., bondwire 34) and the output of amplifier 26 (i.e., bondwires 27 and 28) may be determined by noting the amount of current flowing in them and their relative pitches. The spectral content analysis performed in block 44 will give the amount of LO signal present in bondwires 34A and 34. The coupling effect determined in block 48 may yield the amount of coupling from bondwires 34A and 34 to bondwires 27 and 28. As illustrated in block 50, with these two factors known, processor 3 may determine the amount of LO signal (from bondwires 34 and 34A) that is coupling into the output of amplifier 26 (into bondwires 27 and 28). Processor 3 may determine that the amount of coupling is above a predetermined threshold (e.g., 10% of the signal value) and indicate that a resistor capacitor combination selected according to Equation (4) would be beneficial in reducing this coupling. In addition, a user may determine, after reviewing the coupling contribution determination of block 50, that a resistor capacitor combination would be beneficial regardless of the indication of processor 3.

In addition to noise being generated on the power supply $V_{DD}$, since device 10 is implemented in integrated circuit form, the LO signal may leak into the output signal through the substrate. Accordingly, device 10 may be fully or partially implemented in a differential form. For example, summer 22 and amplifiers 24 and 26 are shown implemented in differential form. Furthermore, single and double guardrings may be implemented in the substrate around the potentially problematic portions of device 10, as shown in FIG. 1B. The use of guardrings is discussed in "Analog Integrated Circuit Design," by Johns and Martin, p. 115. These guardrings may further isolate the LO signal present in the divider 20 from leaking into the amplifiers 24 and 26.

Another technique for reducing LO signal leakage includes implementing amplifiers 24 as current mode amplifiers. For example, if amplifier 24 is implemented in voltage mode form, the differential signals from summer 22 may achieve a 200 mV peak-to-peak magnitude. In certain wireless standards, this signal may be attenuated by amplifiers 24 and 26 by as much as 80 dB or three orders of magnitude resulting in a 0.02 mV peak-to-peak output voltage. Such a low output voltage may easily be perturbed by noise through the substrate or the power supply. If however, amplifier 24 were implemented as a current mode amplifier and the signal from summer 22 were provided as a current, then the voltage swing may not be as drastic. Accordingly, implementing amplifier 24 as current mode amplifier and providing the signal from summer 22 as a current, instead of a voltage, may aid in reducing signal perturbations from the substrate or the power supply. In addition, device 10 may also benefit by implementing amplifier 26 as a current mode amplifier. Current mode amplifiers are discussed generally in "Analog Integrated Circuits," $3^{rd}$ edition, by Gray and Meyer on p. 547.

While embodiments of the present invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. As such, although the direct conversion techniques are described above, this disclosure equally applies to non-direct conversion techniques as well. Furthermore, this technique may assist in reducing spurious emission in RF transmissions. Accordingly, the scope of protection is not limited by the description set out above. Each and every claim is incorporated into the specification as an embodiment of the present invention.

What is claimed is:

1. A wireless transmitter, comprising:
   a divider providing a local oscillation (LO) signal;
   a plurality of mixers coupled to the divider, wherein the mixers receive the LO signal and receive a signal to be modulated;
   a summer coupled to the plurality of mixers; and
   a plurality of amplifiers serially coupled to the summer;
   wherein the divider couples to a capacitor, a resistor, and a power supply and wherein the resistor and the capacitor form a pole that attenuates the LO signal present on the power supply.

2. The transmitter of claim 1, wherein the pole is determined by the equation:

$$\omega_{LO} = 2 \cdot \Pi \cdot f_{LO} > 1/R \cdot C,$$

where $f_{LO}$ is the frequency of the LO signal in hertz, R is the resistance of the resistor, and C is the capacitance of the capacitor.

3. The transmitter of claim 1, wherein the divider provides a quadrature version of the LO signal.

4. The transmitter of claim 1, further comprising a phase-locked loop (PLL), wherein the divider is integrated into the PLL.

5. The transmitter of claim 1, further comprising guardring structures.

6. The transmitter of claim 1, wherein the capacitor is implemented as a MOSFET capacitor in accumulation mode.

7. The transmitter of claim 1, wherein the summer and amplifiers are implemented as current mode devices.

8. The transmitter of claim 1, wherein the transmitter is encapsulated in a package and the package facilitates the LO signal leaking into other areas of the transmitter.

9. The transmitter of claim 1, wherein the LO signal has a frequency at least three orders of magnitude greater than a frequency of the signal to be modulated.

10. The transmitter of claim 1, wherein the LO signal present on the power supply becomes more pronounced as a power level of the amplifiers decreases.

11. A method for reducing leakage in a transmitter, comprising:
  measuring a power supply current;
  estimating a spectral content of the power supply current;
  determining an amount of coupling that arises from a package that the transmitter is encapsulated in;
  determining a contribution of a local oscillator (LO) in the spectral content; and
  deciding whether to couple a resistor and a capacitor to the LO's power supply connection.

12. The method of claim 11, further comprising attenuating the LO contribution in the spectral content by generating a pole, wherein the pole is determined by the equation:

$$\omega_{LO} = 2 \cdot \Pi \cdot f_{LO} > 1/R \cdot C,$$

where $f_{LO}$ is the frequency of the LO signal in hertz, R is the resistance of the resistor, and C is the capacitance of the capacitor.

13. The method of claim 12, wherein the resistance of the resistor is in the range of 50-100 Ω.

14. The method of claim 13, wherein the capacitance of the capacitor is variable.

15. The method of claim 11, wherein determining a contribution of a LO in the spectral content further comprises including estimations of mismatch within the transmitter.

16. The method of claim 11, wherein the coupling of the package is due to the inductive contributions of bondwires within the package.

17. The method of claim 11, wherein the contribution of a local oscillator in the spectral content becomes more prevalent a power level of a signal generated by the transmitter decreases.

18. The method of claim 11, further comprising implementing an amplifier and a summer in differential form.

19. The method of claim 18, wherein the amplifier is implemented as a current mode amplifier.

20. A wireless transmitter, comprising:
  a means for providing a local oscillation (LO) signal;
  a means for mixing signals coupled to the means for providing the LO signal;
  a means for summing signals coupled to the means for mixing signals; and
  a means for amplifying coupled to the means for summing;
  wherein the means for providing the LO signal couples to a means for filtering and wherein the means for filtering generates a pole that attenuates the LO signal present on a power supply.

21. The wireless transmitter of claim 20, wherein the transmitter is implemented as an integrated circuit device on a substrate, and further comprises a means for isolating a portion of the substrate that includes the means for providing the LO signal.

22. A device, comprising:
  a die with circuitry integrated thereon, wherein the circuitry further comprises an oscillator capable of producing the highest frequencies available on the device;
  one or more. signal leads coupled to the die, wherein the signal leads convey signals of interest to an antenna;
  one or more power leads coupled to the die to supply power to the circuitry; and
  wherein the circuitry includes an attenuation circuit, coupled between the power leads and the oscillator comprising a resistor coupled to a capacitor, that generates a pole with a frequency that is less than the frequency generated by the oscillator, is operable. to prevent noise from coupling from the power lead to the signal lead.

23. The device of claim 22, wherein the capacitor has a capacitance that is binary weighted.

24. The device of claim 22, wherein the capacitor's capacitance is varied as the frequency of the oscillator is varied.

25. A device, comprising:
  a die with circuitry integrated thereon, including an oscillator;
  one or more signal leads coupled to the die, wherein the signal leads convey signals of interest to an antenna;
  one or more power leads coupled to the die to supply power to the circuitry; and
  wherein the circuitry includes an attenuation circuit that generates a pole with a frequency that is less than the frequency generated by the oscillator.

26. A device, comprising:
  a die with circuitry integrated thereon;
  one or more signal leads coupled to the die, wherein the signal leads convey signals of interest to an antenna;
  one or more power leads coupled to the die to supply power to the circuitry; and
  wherein the circuitry includes an attenuation circuit that generates a pole that attenuates a local oscillation (LO) signal present on the one or more power leads.

* * * * *